M. ANNINGER.
GAS METER.
APPLICATION FILED APR. 30, 1919.

1,421,140.

Patented June 27, 1922.

Inventor:-
Mario Anninger,
By:- B. Singer,
Atty.

UNITED STATES PATENT OFFICE.

MARIO ANNINGER, OF TRIESTE, ITALY.

GAS METER.

1,421,140.  Specification of Letters Patent.  Patented June 27, 1922.

Application filed April 30, 1919. Serial No. 293,814.

*To all whom it may concern:*

Be it known that I, MARIO ANNINGER, gentleman, subject of King of Italy, residing at Trieste, Kingdom of Italy, have invented certain new and useful Improvement in Gas Meters, of which the following is a specification.

This invention relates to automatically stopped dispensing apparatus and which is adapted to be driven by the clockwork of a gas meter and is designed to permit delivery of varying quantities of gas as required by the customer.

An object of this invention is to provide a device of this character which may be included within the meter frame or housing and in which a portion of the clockwork of the meter duly functions with a portion of the automatic stop device.

A further object of this invention is to simplify and reduce the number of parts of devices of this character and provide one which is positive in its operation and will be durable, and to reduce the liability of tampering therewith by unauthorized persons.

A further object of this invention is to provide an improved apparatus so constructed as to stop automatically the delivery of gas as soon as a predetermined quantity of gas has been consumed, and one which may be quickly set by a member of the gas works staff.

Figure 1:
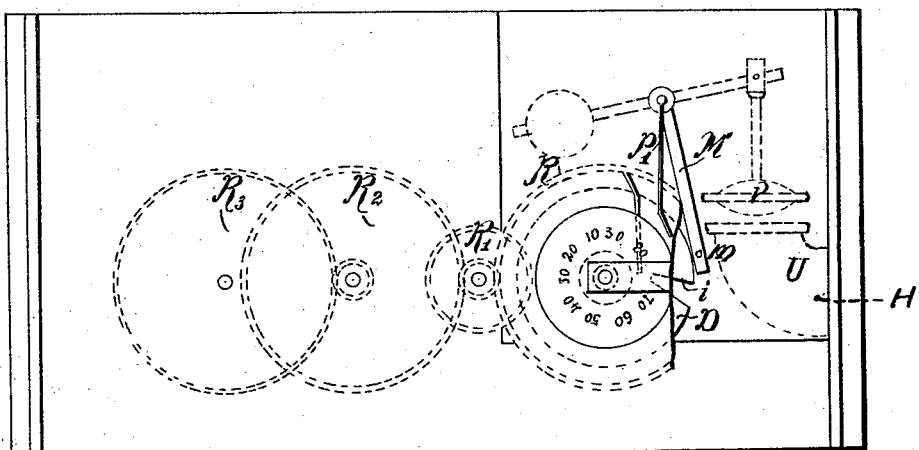
Figure 1 is an elevation of the improved apparatus.
Figure 2:
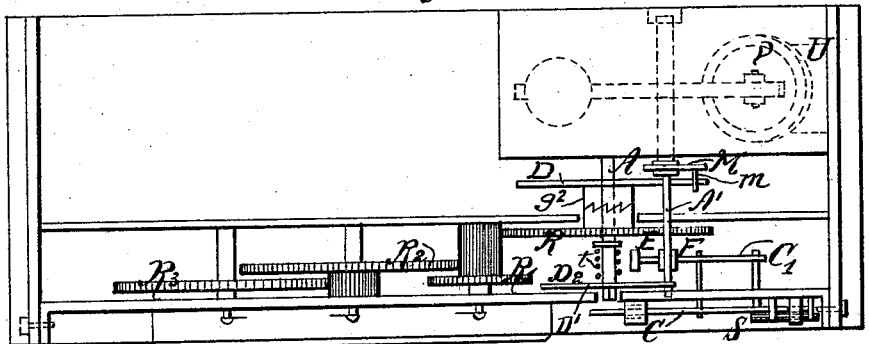
Figure 2 is a plan view thereof.
Figure 3:
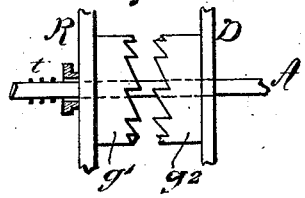
Figure 3 is a fragmentary side elevation of the clutch mechanism.

The improved distributing apparatus is operated by a gear R having the same number of teeth and the same pitch diameter as the gear $R^2$ which gear $R^2$ is the usual gear actuating the tens pointer of the clockwork of the gas meter. The gear R is mounted on the shaft A in such a manner that it is slidable longitudinally of said shaft gearing and with it a clutch member $g^1$ to which it is affixed. This clutch member $g^1$ has ten teeth adapted to engage with like teeth of a cooperating clutch member $g^2$ that faces it. The clutch member $g^2$ and the disk D and the dial D' are fixedly mounted to the shaft A. The disk D is notched at I which notch is adapted to receive the pin $m$ of an arm M. The arm M, together with the arm A', form a bell crank which carries a valve V, which valves seats in the open end of an elbow U so that when the bell crank is moved in a clockwise direction the valve V effects a closure which prevents the gas from passing through the elbow U. The gas normally passes through the usual meter and from thence into the box containing the valve V and thence through the elbow U, but when the valve V is in closed relation to the elbow U the flow of gas is stopped through the meter. The wheel $R^3$ being driven by the wheel $R^2$ may be of any suitable structure and mount to carry the increased decimal indicator of the dial.

The dial D' is marked with numerals designating the quantities of gas to be delivered corresponding with the number of teeth of the clutch. In the present instance, as shown in the drawings, the movement of one tooth corresponds to the delivery of ten cubic feet of gas.

The gears $R^3$ and $R^2$ are actuated by the flow of gas through a conventional form of meter and in turn actuate the gear $R^1$ by engagement of the gear teeth of the gear $R^2$ with the pinion carried by the gear $R^1$. This causes, by reason of the equalities of the gears $R^2$ and R, a like rotation of the gear R to that of the gear $R^2$, so that when a predetermined amount of gas has gone through the gas meter, as indicated upon the dial D', the quantity likewise being indicated by the meter dial carried by an indicator upon the shaft carrying the gear $R^2$, the pin $m$ will fall into the slot I and thereby effect a closure of the valve V and prevent a further passage of gas. This rotation imparted to the gear R causes a counterclockwise rotation to the disk D thereby causing the numerals on the said disk to move in a descending order until they have moved from the position in which they have been set by the authorized agent of the gas company to the zero position, whence the meter is automatically disabled from further carrying gas therethrough until again set by the said agent. A spring thus loosely mounted upon the shaft A and serves to urge the gear R toward the disk D and thereby retain the clutch members yieldingly in engagement. A spring $p'$ yieldingly urges the pin $m$ into the slot I and is withdrawn from so urging the said pin into said slot by engagement with a member E which is slidably carried by a rod $C^1$, which rod $C^1$ is a part of the locking mechanism hereinafter described.

The shaft A has a square front end adapted to receive a key for turning the said shaft. The keyhole in the casing through which the key is inserted is normally closed by a bolt C of the lock S for the purpose of preventing unauthorized persons from setting the apparatus. Parallel to the bolt C and connected to it, is a rod $C^1$ ending in a plate having a slightly curved end E, opposite which is situated another plate F fixed on the prolongation of the axle $A^1$ of the valve V.

When the apparatus is not set, the dial $D^1$ is at zero; the pin $m$ is engaged in the notch $i$ of the disc D; the valve V is lowered on to the gas pipe U, and the plates E and F are in contact with each other. To operate the apparatus, it is necessary first to open the lock S and shift the bolt C. This operation causes the rod $C^1$ and the plates E and F to move to such an extent as to allow of disengaging the pin $m$ from the notch $i$ and bringing it on to the periphery of the disc D. The latter is then free to turn with the shaft A. The valve V having been raised at the same time, the gas can pass out through the pipe H.

As the shaft A rotates, the inclined teeth of the cylinder $g^2$ which also rotates, press against the teeth of the cylinder $g^1$ in such a manner as to cause the latter to slide along the shaft (together with the wheel R) to an extent sufficient to allow of shifting the cylinder $g^2$ by one tooth relatively to the cylinder $g^1$. This same shifting movement is necessarily shared by the disc D and the dial $D^1$ which are connected to the cylinder $g^2$, and therefore it is obvious that in order to set the apparatus for delivering the determined quantity of gas, it will be sufficient to shift the cylinder $g^2$ relatively to the cylinder $g^1$ through the necessary number of teeth in order to render visible through the window of the casing of the apparatus the numeral indicating the desired quantity of gas.

The apparatus having been set in operation, the wheel R which is maintained by the spring $t$ in a position that keeps the toothed cylinders $g^1$ and $g^2$ in engagement with each other, transmits the motion of the clockwork to the disc D and the dial $D^1$. This rotary motion being in a direction contrary to that which has been imparted to the said parts in setting the apparatus, that is to say when the shaft A has been turned by means of the key, the result will be that the disc D will be brought back gradually to the zero position of the dial and at the same time the pin $m$ of the crank M will fall into the notch $i$ of the disc D, and thus cause the valve V to close down upon the gas pipe U.

It is to be understood that the axial displacement which can be performed by the wheel R along the shaft A in setting the apparatus, will allow of resetting the apparatus before the predetermined quantity of gas has been completely consumed, thereby allowing of an uninterrupted delivery of gas.

What I claim is:

1. An improved apparatus applicable to gas meters for the purpose of delivering varying quantities of gas as required by the consumer, comprising a cutoff, an indicator of a predetermined amount of gas to be delivered, a shaft carrying said indicator, a key seat mounted on said shaft, said indicator movable in one direction without the movement of said cutoff, a member mounted upon said shaft and provided with a recess, means projecting from said cutoff in the track of said recess whereby upon the insertion of a key upon the said key seat and the turning of said key, the said indicator is set to indicate a predetermined amount of gas to be delivered and the said projection will be engaged in the said recess and moved thereby upon the turning of the said shaft to position the said indicator at said predetermined position and thereby close the supply of gas.

2. In a gas meter, a cutoff mounted upon a shaft, a lever affixed to said shaft and provided with a projecting lug, a secondary shaft with a cam mounted thereon, an indicator mounted upon said second shaft, said lug in the path of said cam and said lug and cam adapted to move said lever upon a predetermined positioning of said indicator, means for positioning said indicator to a predetermined position and thereby positioning said cam so that upon the movement of said second shaft to said predetermined position, the said lug will be urged into a depression in said cam and thereby close the said cutoff.

3. In a gas meter, dials indicating the consumption of gas in decimal form, a secondary dial indicative of a predetermined permitted consumption of gas and mounted upon a shaft, a gear loosely mounted upon said shaft when said shaft is turned in one direction and fixedly mounted upon said shaft when said shaft is turned in a reverse direction, said gear co-meshing with one of the gears of said decimal system, a disk mounted upon said shaft and provided with a recess, and a cutoff provided with a projection extending in the path of said disk.

4. In a meter, a decimal indicator of the amount of fluid passing through said meter, a shaft provided with a disk fixedly mounted thereon, said disk provided with a recess and having a hub with a clutch face, a gear mounted upon said shaft and provided with a clutch hub to engage in the hub of said disk, a secondary disk mounted on the opposed end of said shaft, a coiled spring interposed between said second disk and said gear and yieldingly holding said gear against said clutch, a spring urged member in the path of said recessed disk, means for rotating said shaft in one direction by the insertion of a key and in the reverse direction by said decimal indicator, said means including a pinion in said decimal indicator co-meshing with said gear, said clutch members provided with angular teeth whereby upon the turning of said shaft by said key, the said gear is forced longitudinal of said shaft against the yielding of said coiled spring and out of disengagement so that it rotates freely upon said shaft.

In testimony whereof I have affixed signature in presence of two witnesses.

MARIO ANNINGER.

Witnesses:
NATILDE NATESFO,
LEO MARLINUZZI.